May 1, 1923.

S. CLIFFORD

STEAM RING

Filed April 1, 1922

1,453,378

Inventor
Sanna Clifford
By her Attorney
Wm Bodge

Patented May 1, 1923.

1,453,378

UNITED STATES PATENT OFFICE.

SANNA CLIFFORD, OF OSSINING, NEW YORK.

STEAM RING.

Application filed April 1, 1922. Serial No. 548,788.

*To all whom it may concern:*

Be it known that I, SANNA CLIFFORD, citizen of the United States, and resident of Ossining, in the county of Westchester and State of New York, have invented certain new and useful Improvements in Steam Rings, of which the following is a specification.

The invention relates generally to cooking utensils, and it has for an object to provide a device whereby a plurality of cooking vessels may be arranged in superposed relation and the material therein cooked by a single burner or single stove unit.

A further object is to provide a device whereby the steam escaping from the material being cooked in a lower vessel is utilized in cooking or heating material contained in an upper vessel, and in a chamber adjacent thereto.

The improved device comprises generally a chambered ring of which a series may be provided, and which is adapted to serve as a cover for a lower vessel and a support for an upper vessel. This device may be termed a steam ring.

For further comprehension of the invention, and of the objects and advantages thereof, reference will be had to the following description and accompanying drawings, and to the appended claims in which the various novel features of the invention are more particularly set forth.

Figure 1 of the drawings is a vertical sectional view showing the improved device employed in connection with a series of superposed cooking vessels.

Figure 1:
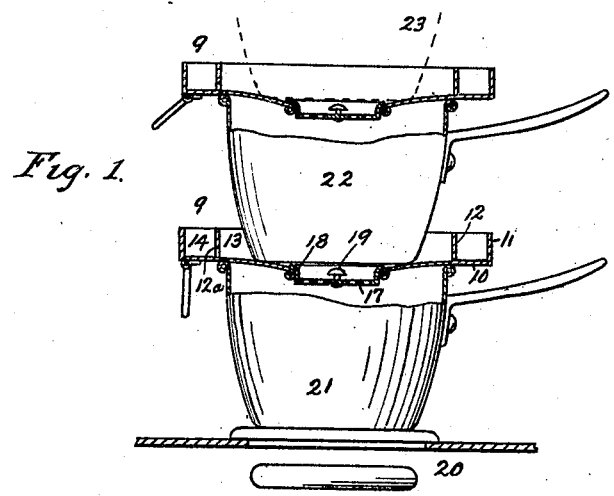
Figure 2:
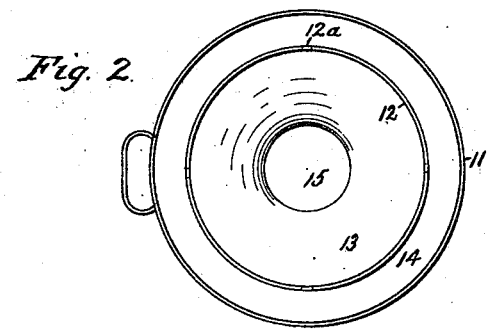
Fig. 2 is a plan view of the steam ring alone.
Figure 3:
Fig. 3 is a similar view of the perforated cover for closing the ring aperture.

As here shown the improved device comprises a chambered steam ring 9, having a base or bottom wall 10, provided with a pair of vertical annular flanges 11 and 12, which divide the ring into a central chamber 13 and an outside or rim chamber 14. The bottom wall of the central chamber is provided with a central aperture 15, toward which this bottom wall slightly slopes to form a draining surface. The aperture 15 is closed with a perforated cover 16, preferably formed as shown with a perforated body part 17 and an upwardly extending curved flange 18, adapted to rest on the top of the bottom wall surrounding the aperture, a handle 19 being provided for the closure by which the latter may readily be detached from the steam ring for observing the cooking conditions within the vessel.

Fig. 1 of the drawings illustrates the application of the improved device. In this figure a portion of a gas stove is indicated at 20, and a cooking vessel 21 is supported thereon. Upon this vessel is placed one of the steam rings 9, having its central aperture closed with the perforated cover, while a second vessel 22 is supported on the ring within the central chamber, this second vessel being covered with another ring which is also shown as having a perforated cover in place. The steam rising from the cooking of the material in the lower vessel 21, passes through the perforated cover and heats the second vessel 22, cooking or heating the material therein. As indicated in the dotted lines at 23, a third vessel may be superposed on the vessel 22. In the use of a series of superposed vessels the materials requiring the greatest heat for cooking will preferably be placed in the lowest vessel, materials requiring less heat being placed in the upper vessel or vessels.

The steam rising from a vessel not only serves to heat the superposed vessel but also heats the chamber 14 formed on the steam ring and which chamber is herein designed to serve as a container for heating or maintaining food articles in a heated condition, the heat thus utilized for the chamber being a heat that would otherwise be wasted.

Under normal conditions comparatively small amount of steam will escape from between the ring and the bottom of its superposed vessel, but under rapid boiling action, the water is liable to be picked up and carried along with the steam. To overcome this tendency the perforated closure 16 acts as a separator to collect the water as it tends to flow through the relatively small perforations, and allow the steam to escape therefrom in a comparatively dry condition. Any steam or heat passing out from between the ring and a superposed vessel will be deflected by the flange 12 of the central chamber and urged against the outside of said vessel and thus increase the heating action therein. Also any water of condensation collecting in this chamber will be drained back into the lower vessel by the downwardly sloping bottom wall thereof.

For food articles containing excessive moisture that may be held in the outer compartment 14, suitable draining passages may be made through the base of the flange 12, as indicated at 12$^a$.

What I claim as my invention and desire to secure by Letters Patent, is as follows:

1. A device for use in connection with cooking vessels comprising a base plate provided with a central aperture and adapted to rest as a closure on the top of a lower vessel, and a pair of spaced flanges projecting above said base plate, the inner of said flanges being disposed in spaced relation with the aperture of said base plate and forming therewith a central chamber for the support of an upper cooking vessel and also forming with the outer flange an outer rim chamber adapted to utilize the escaping heat and serve as a heating compartment.

2. A device for use in connection with cooking vessels comprising a base plate provided with a central aperture and adapted to rest as a closure on the top of a lower vessel, said base plate being downwardly sloped toward the aperture thereof, a pair of spaced flanges projecting above said base plate, the inner of said flanges being disposed in spaced relation with the aperture of said base plate and forming therewith a central chamber for the support of an upper cooking vessel and also forming with the outer flange an outer rim chamber, the inner of said flanges being provided with a drain outlet for the outer chamber.

3. A device for use in connection with cooking vessels comprising a base plate provided with a central aperture and adapted to rest as a closure on the top of a lower vessel, a pair of spaced flanges projecting above said base plate, the inner of said flanges being disposed in spaced relation with the aperture of said base plate and forming therewith a central chamber for the support of an upper cooking vessel and also forming with the outer flange an outer rim chamber, and a detachable perforated closure for the aperture of said base plate.

4. A device for use in connection with cooking vessels comprising a base plate provided with a central aperture and adapted to rest as a closure on the top of a lower vessel, said base plate being downwardly sloped toward the aperture thereof, a pair of spaced flanges projecting above said base plate, the inner of said flanges being disposed in spaced relation with the aperture of said base plate and forming therewith a central chamber for the support of an upper cooking vessel and also forming with the outer flange an outer rim chamber, the inner of said flanges being provided with drain outlets for the outer chamber, and a detachable perforated closure for the aperture of said base plate.

Signed at New York, in the county of New York and State of New York, this 30th day of March, A. D. 1922.

SANNA CLIFFORD.